INVENTORS.
HORACE E. DARLING &
HOLTON E. HARRIS

United States Patent Office 3,204,172
Patented Aug. 31, 1965

3,204,172
SEMICONDUCTOR CONTROLLED RECTIFIER CIRCUITS
Horace E. Darling, North Attleboro, Mass., and Holton E. Harris, New York, N.Y., assignors to Harrel, Incorporated, New York, N.Y., a corporation of Delaware
Filed Dec. 14, 1959, Ser. No. 859,454
4 Claims. (Cl. 321—8)

This invention relates to circuits incorporating a semiconductor controlled rectifier.

Semiconductor controlled rectifiers including, for example, silicon controlled rectifiers, have been used to monitor current flow in a wide variety of applications. In any use of a semiconductor controlled rectifier, accurate and reliable circuits must supply timed current pulses to a gate electrode to initiate conduction of the device. For example, controlled D.-C. power sources have been obtained by connecting to an A.-C. source a pair of semiconductor controlled rectifiers to conduct alternately on positive and negative half cycles. The two controlled rectifiers must be fired at selected times to regulate the amount of power supplied to a D.-C. output circuit. Inherent timing difficulties as well as the expense of two controlled rectifiers make this circuit less than satisfactory.

The present invention provides circuits for controlling a semiconductor controlled rectifier accurately and efficiently. Moreover, the inventive circuits may be used to fire and extinguish a single device during each half cycle of a full wave rectified A.C. power supply to provide a precisely monitored current source. Timed current pulses in the form of steep wave front signals, preferably supplied by a magnetic amplifier, fire the controlled rectifier and are then cut off immediately upon conduction of the controlled rectifier. At the end of each half cycle the potential across the controlled rectifier and the current flowing therethrough are reduced substantially to zero.

Figure 1:
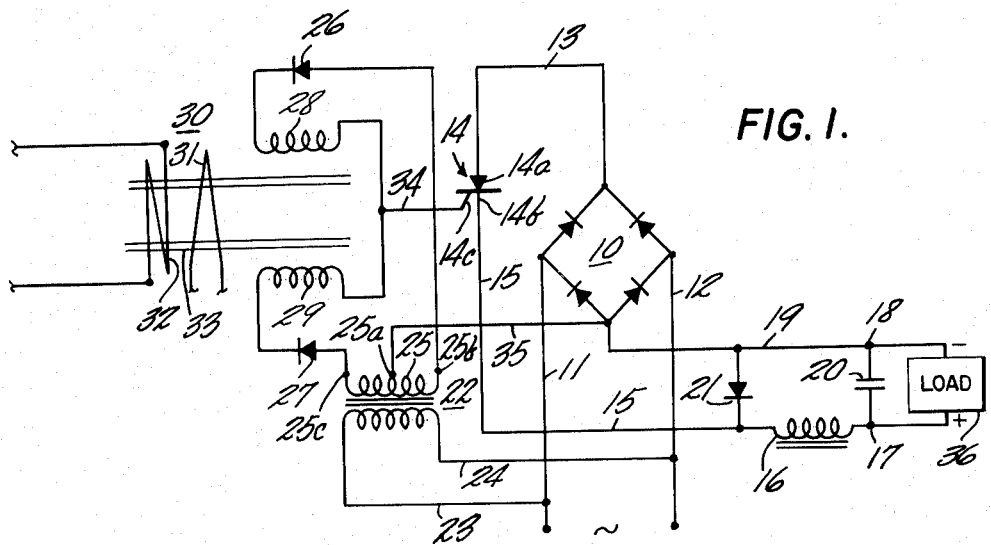
Figure 2:
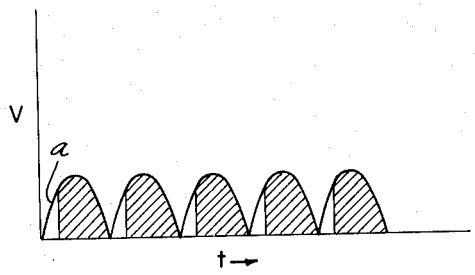
Figure 3:
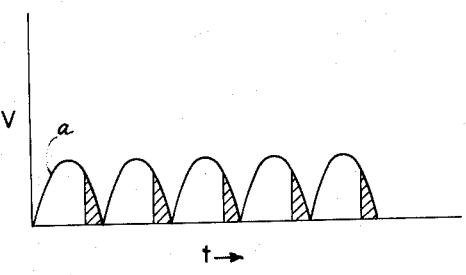

These and further advantages of the invention will be more readily understood when the following description is read in connection with the accompanying drawings, in which:

FIGURE 1 is a schematic circuit diagram illustrating typical control circuits for a semiconductor controlled rectifier in accordance with the present invention; and FIGURES 2 and 3 illustrate waveforms useful in describing the operation of the circuits shown in FIGURE 1.

Referring to an illustrative embodiment of the invention in greater detail with particular reference to FIGURE 1, a full wave rectifier 10, shown as a bridge rectifier but which may take other forms such as a center-tapped transformer and diode full wave rectifier, for example, is energized through conductors 11 and 12 by an A.-C. power supply. One output terminal of the full wave rectifier 10 is joined by a conductor 13 to an anode 14a of a gated or controlled semiconductor rectifier 14. A cathode 14b of the rectifier 14 is coupled through a line 14 and an optional smoothing choke 16 to a load terminal 17. The other load terminal 18 is connected directly by a line 19 to the second output terminal of the full wave rectifier 10.

If a well filtered output is required, a capacitor 20 may be connected across the output terminals 17 and 18 to cooperate with the choke 16. A diode 21 across the lines 15 and 19, ahead of the smoothing choke 16, stabilizes the circuit, as explained hereinafter.

To gate the semiconductor controlled rectifier 14, a voltage source is provided in the form of a transformer 22, energized in phase with the A.-C. power supply by conductors 23 and 24. A center-tapped secondary winding 25 on the transformer 22, in which the voltage on each side of a center-tap 25a is somewhat lower than the power supply voltage, has its outer terminals 25b and 25c joined through diodes 26 and 27 to gate windings 28 and 29, respectively, of a magnetic amplifier 30. Conventional bias and control windings 31 and 32 are provided on a saturable magnetic core 33 to form, with the gate windings 28 and 29, the magnetic amplifier 30.

A conductor 34 joins the other side of the amplifier gate windings 28 and 29 to a control or gate electrode 14c of the semiconductor rectifier 14. To complete the circuit, a conductor 35 couples the transformer center-tap 25a to the output circuit of the bridge 10.

The semiconductor controlled or gated rectifier 14 remains nonconductive when subjected to positive voltage pulses by the bridge 10 until sufficient current flows into the gate electrode 14c as a result of a potential difference between the gate 14c and cathode 14b. As soon as such gate current attains sufficient amplitude, the controlled rectifier 14 conducts and the gate 14c loses all control. Conduction continues until the potential difference across the rectifier 14 and the current flow therethrough are reduced substantially to zero. For example, PNPN high power bistable controlled switching devices handling up to 16 amperes, such as the General Electric Silicon Controlled Rectifiers C35B and C36B, and Transitron Silicon Controlled Rectifier TCR202, are suitable for use in this circuit. Typically, a gate current on the order of 10 milliamperes at 1.5 volts will fire the C35B controlled rectifier.

The magnetic amplifier 30 is conventional in design and includes the bias winding 31 and the control winding 32 to saturate the core 33 selectively. When the conditions in the magnetic amplifier windings are such that the core 33 becomes saturated, the impedance of the gate windings 28 and 29 drops sharply from a high impedance to substantially zero to provide a gated output signal with a steep wave front, in accordance with usual magnetic amplifier operation.

In operation, assuming a load 36 connected across the terminals 17 and 18 and the input lines 11 and 12 energized by a suitable A.-C. power supply, when the right hand side of the secondary winding 25 swings positive with respect to the center-tap 25a, current tends to flow through the diode 26 and the magnetic amplifier gate winding 28. If the magnetic core 33 is unsaturated, the gate winding 28 presents a very high impedance and no substantial current will flow to the gate electrode 14c of the controlled rectifier 14.

If the core 33 is saturated before or during the positive swing of the right hand terminal 25b of the secondary winding 25, the impedance of the gate winding 28 will suddenly drop almost to zero to provide substantially a direct connection between the secondary winding 25 and the gate electrode 14c. The circuit from the secondary winding terminal 25b is completed through the rectifier cathode 14b, the conductor 15, the smoothing choke 16, the load 36 and the conductors 19 and 35 to the secondary winding center tap 25a.

The voltage across the transformer winding 25 is in phase with the voltage supplied to the bridge 10. Therefore, if a voltage pulse a, shown in FIGURES 2 and 3, is provided across the rectifier 14 coincidently with switching of the gate winding 28 from a high to a low impedance, conduction through the controlled rectifier 14 will be initiated. It is apparent that the conduction period of the rectifier 14 during each half cycle is determined by the timing of the steep wave front current pulse provided by the magnetic amplifier 30.

In FIGURE 2 the rectifier 14 is gated early in the cycle to supply a relatively high power output. In contrast, in FIGURE 3 the gate pulses are supplied late in the cycle to provide a relatively short conduction period and lower power output. The magnetic amplifier 30 may be readily controlled to provide a wide range of monitored currents.

In any operation of the controlled rectifier 14, at the end of each half cycle the voltage across the controlled rectifier 14 and the current flow therethrough are reduced substantially to zero by the full wave rectifier 10 so that the gate 14c may regain control of the device. If an inductive filter or load is connected in circuit, the diode 21 may also be included in the means to reduce current flow through the controlled rectifier at the end of each half cycle of operation, for reasons explained hereinafter.

The semiconductor controlled rectifier 14 requires, for accurate firing, a steep wave front gate pulse since the exact current amplitude necessary to fire the device may vary somewhat due to aging and temperature conditions. Therefore, slow-rise waveforms, often used to fire voltage controlled rectifiers, are unsatisfactory for initiating conduction of current controlled semiconductor rectifiers. On the other hand, short high amplitude current pulses, heretofore widely used to fire gated semiconductor rectifiers, when supplied to the gate electrode in advance of the voltage pulse across the anode and cathode due to erratic timing, for example, fail to fire the device and provide uncertain operation.

The optimum waveform to fire the controlled rectifier 14 has substantially zero rise time and is cut off or terminated as soon as the device conducts. The magnetic amplifier 30 supplies such a waveform to the gate 14c, due to its magnetic saturation characteristic and, therefore, fires the rectifier 14 at precisely the proper time in the cycle. Moreover, the steep wave front current pulse to the gate 14c is maintained until conduction of the controlled rectifier 14 is initiated at which time the current pulse that initiated conduction is cut off.

In particular, subsequent to conduction, the controlled rectifier 14 acts as a closed switch or substantial short circuit in the circuit and current flows therethrough to the load 36. Consequently, the potential of the cathode 14b goes positive and follows the line voltage to provide an effective reversal of polarity between the gate 14c and the cathode 14b, since the voltage between the center-tap 25a and terminal 25b is substantially less than the A.-C. power supply voltage. The diode 26, however, blocks reverse current flow so that the reverse potential appears thereacross and the rectifier 14, which is unable to withstand such reverse voltages, is protected.

In other words, the above operation provides a steep wave front current pulse to the gate 14c which is terminated upon conduction of the rectifier 14, an important consideration since continued flow of the gating current would injure the device.

During the cycle described above, current flow through the left hand half of the secondary winding 25 has been blocked by the diode 27. On the next half cycle, the left hand terminal 25c of the winding 25 goes positive and the controlled rectifier 14 may be fired in a manner similar to that described above.

In some applications of the inventive circuit, current flow may be monitored solely to resistive loads without a filtered output. In that event, the smoothing choke 16, capacitor 20 and diode 21 may be eliminated in the interests of economy. However, when an inductive load must be powered or a smoothing chock used in the output, the diode 21 provides stable operation of the power supply.

In particular, inductance in the smoothing choke or load tends to maintain current flow in the output circuit. Since the voltage drop across the controlled rectifier 14 and the current flow therethrough must be substantially zero at the end of each half cycle of the rectified wave from the full wave rectifier 10, inductance in the output tending to maintain current flow through the rectifier tends to produce erratic operation. With the diode 21 connected as shown, if an inductance in the output circuit tends to maintain current flow after the line voltage goes to zero, such current flow will transfer to the diode 21 and no current will flow through the rectifier 14. It is apparent that the polarization of the diode 21 does not interfere with normal operation of the circuit. If for any reason high positive peaks are expected at the output, a high voltage Zener diode may be used as the diode 21, to prevent breakdown.

In an illustrative application of the inventive circuit, a power supply of 115 volts at 400 cycles was connected to energize the circuit shown in FIGURE 1 in which the following components were included.

Secondary Winding 25 of Transformer 22—75 volts on either side of the center tap 25a
Controlled Rectifier 14—General Electric Silicon Controlled Rectifier C35B
Smoothing Choke 16—15 millihenry choke
Capacitor 20—100 microfarads
Load 36—85 ohm resistor With the above circuit, an 85 volt output at about 1 ampere with less than 100 millivolts ripple was supplied to the 85 ohm load. Moreover, the load voltage could be controlled accurately and such control was smooth and continuous. Accordingly, the inventive circuits provide effective full wave operation using only a single semiconductor controlled rectifier.

It will be understood that the above-described embodiments of the invention are illustrative only and modifications thereof will occur to those skilled in the art. Therefore, the invention is not to be limited to the specifiic apparatus disclosed herein, but is to be defined by the appended claims.

We claim:

1. Semiconductor controlled rectifier circuits comprising a full wave rectifier including input and output circuits, a semiconductor controlled rectifier including an anode, a cathode and a gate, means connecting the anode and cathode of the controlled rectifier in series in the full wave rectifier output circuit, output terminals in series in the full wave rectifier output circuit adapted to be connected to a load, means to supply timed current pulses to the controlled rectifier gate to initiate conduction of the controlled rectifier, means responsive to conduction of the controlled rectifier to cut off the current pulse that initiated said conduction, and means to reduce current flow through the controlled rectifier substantially to zero at the end of each half cycle of operation.

2. Semiconductor controlled rectifier circuits comprising a full wave rectifier including input and output circuits, the input adapted to be energized by an A.-C. power supply, a semiconductor controlled rectifier including an anode, a cathode and a gate, means connecting the anode and cathode of the controlled rectifier in series in the full wave rectifier output circuit, output terminals in series in the full wave rectifier output circuit adapted to be connected to a load, a magnetic amplifier having a pair of gate windings, a voltage source adapted to be connected in phase with the A.-C. power supply, means to couple the voltage source to the gate of the controlled rectifier through the magnetic amplifier gate windings to supply timed steep wave front current pulses to the gate to initiate conduction of the controlled rectifier, means responsive to conduction of the controlled rectifier to cut off the current pulse that initiated said conduction, and means to reduce current flow through the controlled rectifier substantially to zero at the end of each half cycle of operation.

3. Semiconductor controlled rectifier circuits comprising a semiconductor controlled rectifier including an anode, a cathode and a gate, means to impress a full wave rectified voltage across the anode and cathode, a magnetic amplifier having a pair of gate windings, a diode connected to each gate winding, a transformer having a primary winding and a center-tapped secondary winding, means to energize the primary winding in phase with the full wave rectified voltage impressed across the anode and cathode of the controlled rectifier, means coupling each of the two ends of the secondary winding through one of the two magnetic amplifier gate windings and its associated diode to the gate of the controlled rectifier, means connecting the center-tap of the secondary winding to a point in the full wave rectified voltage impressing means to provide upon conduction of the controlled rectifier a reversal in relative potentials between the cathode and gate of the controlled rectifier, the diodes in circuit with the gate windings and the gate preventing application of reversal voltages across the gate and cathode of the controlled rectifier, whereby timed steep wave front current pulses are supplied to the gate and conduction of the controlled rectifier cuts off the current pulse that initiated said conduction, and means to reduce current flow through the controlled rectifier substantially to zero at the end of each half cycle of operation.

4. Semiconductor controlled rectifier circuits comprising a full wave rectifier including input and output circuits, the input adapted to be energized by an A.-C. power supply, a semiconductor controlled rectifier including an anode, a cathode and a gate, means connecting the anode and cathode of the controlled rectifier in series in the full wave rectifier output circuit, output terminals in series in the full wave rectifier output circuit adapted to be connected to a load, a magnetic amplifier having a pair of gate windings, a diode connected to each gate winding, a transformer having a primary winding and a center-tapped secondary winding, means to energize the primary winding in phase with the A.-C. voltage supply, means coupling each of the two ends of the secondary winding through one of the two magnetic amplifier gate windings and its associated diode to the gate of the controlled rectifier, means connecting the center-tap of the secondary winding to a point in the output circuit of the full wave rectifier to provide upon conduction of the controlled rectifier a reversal in relative potentials between the cathode and gate of the controlled rectifier, the diodes in circuit with the gate windings and the gate preventing application of reversal voltages across the gate and cathode of the controlled rectifier, whereby timed steep wave front current pulses are supplied to the gate and conduction of the controlled rectifier cuts off the current pulse that initiated said conduction, and means to reduce current flow through the controlled rectifier substantially to zero at the end of each half cycle of operation.

References Cited by the Examiner

UNITED STATES PATENTS

| | | | |
|---|---|---|---|
| 2,577,151 | 12/51 | Potter | 321—25 |
| 2,772,387 | 11/56 | Liguori | 321—23 |
| 2,809,303 | 10/57 | Collins | 323—22 |
| 2,925,546 | 2/60 | Berman | 321—25 |
| 2,987,666 | 6/61 | Manteuffel | 321—25 |

FOREIGN PATENTS 1,058,615   6/59   Germany.

OTHER REFERENCES

"Magnetic Amplifier Triggers Silicon Controlled Rectifiers," Electrical Design News, June 1959.

"Solid State Thyratron Switches Kilowatts," Frenzel and Gutzwiller, Electronics, March 28, 1958.

LLOYD McCOLLUM, *Primary Examiner.*

SAMUEL BERNSTEIN, *Examiner.*